US012644558B2

(12) United States Patent
Ryon et al.

(10) Patent No.: US 12,644,558 B2
(45) Date of Patent: Jun. 2, 2026

(54) VARIABLE THERMAL INSULATION

(71) Applicant: Collins Engine Nozzles, Inc., Des Moines, IA (US)

(72) Inventors: Jason A. Ryon, Carlisle, IA (US); Viktor Kilchyk, Lancaster, NY (US); Eric Surawski, Hebron, CT (US)

(73) Assignee: COLLINS ENGINE NOZZLES, INC., West Des Moines, IA (US)

( * ) Notice: Subject to any disclaimer, the term of this patent is extended or adjusted under 35 U.S.C. 154(b) by 376 days.

(21) Appl. No.: 18/111,092

(22) Filed: Feb. 17, 2023

(65) Prior Publication Data

US 2024/0280209 A1 Aug. 22, 2024

(51) Int. Cl.
| | |
|---|---|
| *F16L 59/06* | (2006.01) |
| *B64G 1/58* | (2006.01) |
| *F16L 59/065* | (2006.01) |
| *F16L 59/07* | (2006.01) |
| *F28F 13/00* | (2006.01) |

(52) U.S. Cl.
CPC ............... *F16L 59/06* (2013.01); *B64G 1/58* (2013.01); *F16L 59/065* (2013.01); *F16L 59/07* (2013.01); *F28F 2013/008* (2013.01)

(58) Field of Classification Search
CPC ......... F16L 59/06; F16L 59/065; F16L 59/07; B64G 1/58; F28F 2013/008; F28F 13/14; F28F 2250/08; F28F 2270/00
See application file for complete search history.

(56) References Cited

U.S. PATENT DOCUMENTS

| | | | | |
|---|---|---|---|---|
| 3,270,802 A | * | 9/1966 | Lindberg | ................. B64G 1/50 |
| | | | | 165/104.34 |
| 3,450,196 A | | 6/1969 | Bauer | |
| 3,543,839 A | * | 12/1970 | Shlosinger | .......... F28D 15/0266 |
| | | | | 165/274 |
| 3,814,175 A | * | 6/1974 | Laing | .................... F24F 5/0046 |
| | | | | 165/104.34 |
| 4,037,751 A | | 7/1977 | Miller et al. | |

(Continued)

FOREIGN PATENT DOCUMENTS

| | | |
|---|---|---|
| DE | 3017252 A1 | 11/1981 |
| FR | 3063806 A1 | 9/2018 |

OTHER PUBLICATIONS

Abstract for FR3063806 (A1), Published: Sep. 14, 2018, 1 page.
(Continued)

*Primary Examiner* — Travis Ruby
(74) *Attorney, Agent, or Firm* — CANTOR COLBURN LLP

(57) ABSTRACT

A system includes a wall panel with an exterior wall. An interior wall is separated from the interior wall by a variable insulation gap occupied by an insulation medium. A flow driver is connected in fluid communication with the insulation medium. The flow driver is configured to selectively switch properties of the insulation medium in the variable insulation gap between a conduction mode and in an insulation mode. The insulation medium has a first effective thermal conductivity in the insulation mode, and a second effective thermal conductivity in the conduction mode. The first effective thermal conductively is lower than the second effective thermal conductivity.

10 Claims, 4 Drawing Sheets

(56)        References Cited

U.S. PATENT DOCUMENTS

| | | | | |
|---|---|---|---|---|
| 4,858,678 A | * | 8/1989 | Ladd | F28F 13/00 |
| | | | | 165/104.19 |
| 4,871,012 A | | 10/1989 | Kuo | |
| 5,643,485 A | | 7/1997 | Potter et al. | |
| 5,813,454 A | * | 9/1998 | Potter | F28F 13/00 |
| | | | | 165/96 |
| 5,901,428 A | | 5/1999 | Sheridan | |
| 6,073,888 A | | 6/2000 | Gelon et al. | |
| 7,621,239 B2 | | 11/2009 | Rice | |
| 8,157,209 B2 | | 4/2012 | Dittmar et al. | |
| 2013/0081786 A1 | * | 4/2013 | Clark | E04B 1/74 |
| | | | | 165/96 |
| 2018/0224224 A1 | * | 8/2018 | Bruemmer | F28D 21/0001 |
| 2022/0364357 A1 | | 11/2022 | Song et al. | |

OTHER PUBLICATIONS

Abstract of DE3017252 (A1), Published: Nov. 12, 1981, 1 page.
European Search Report for Application No. 24158086.9, mailed Jun. 17, 2024, 8 pages.
European Office Action for EP Application No. 24158.86.9, dated Nov. 26, 2025, pp. 1-6.

\* cited by examiner

VARIABLE THERMAL INSULATION

BACKGROUND

1. Field

The present disclosure relates to thermal insulation, and more particularly to active insulation such as for use on spacecraft, aircraft, and the like.

2. Description of Related Art

Thermal stabilization of the interior in various application such as satellites, space modules and high-velocity vehicles may be very challenging. For instance, satellite surface temperature on the sunny side may be +150° C. and –100° C. on the opposite side. For a space module rotating around the planet, this may cause undesired issues with the ECS (environment control system) and various other challenges.

The conventional techniques have been considered satisfactory for their intended purpose. However, there is an ever present need for improved systems and methods for thermal management and insulation such as for use in maintaining interior temperatures onboard spacecraft, aircraft, and the like. This disclosure provides a solution for this need.

SUMMARY

A system includes a wall panel including an exterior wall. An interior wall is separated from the exterior wall by a variable insulation gap occupied by an insulation medium. A flow driver is connected in fluid communication with the insulation medium. The flow driver is configured to selectively switch properties of the insulation medium in the variable insulation gap between a conduction mode and in an insulation mode. The insulation medium has a first effective thermal conductivity in the insulation mode, and a second effective thermal conductivity in the conduction mode. The first effective thermal conductively is lower than the second effective thermal conductivity.

The gap can have a substantially constant width spatially, and the substantially constant width can also be substantially constant over time regardless of whether the flow driver is in the insulation mode or in the conduction mode. The substantially constant width, the insulation medium, the exterior wall, and the interior wall can be configured so that in the insulation mode, the gap is too narrow for natural convection currents to form turbulent flows in the gap.

The driver can be configured to stop fluid flow through the variable insulation gap in the insulation mode to inhibit convection across the variable insulation gap, and to drive fluid through the gap in the conduction mode to cause convective heat transfer across the variable insulation gap by forced convection. The flow driver can include at least one of a fan, a blower, an agitator, a fluid chamber with thermally adaptive geometry/volume, or a pump.

The insulation medium can have a convective heat transfer coefficient h between 2.5-25 W/(m²K), inclusive of endpoints, in the insulation mode, and a heat transfer coefficient h between 10-500 W/(m²K), inclusive of endpoints, in the conduction mode, wherein h is higher in the conduction mode than in the insulation mode. The heat transfer coefficient in the conduction mode can be at least 5 times greater than in the insulation mode. The insulation medium can be of a single phase in both the insulation mode and in the conduction mode.

The insulation medium can be a gas. The driver is configured to change pressure and/or density of the insulation medium in switching between the insulation mode and the conduction mode. In the insulation mode the insulation medium can be a vacuum, and wherein in the conduction mode, the insulation medium is a gas. The insulation medium can be a first fluid in the insulation mode, and can be a second fluid in the conduction mode, wherein the flow driver can be configured to swap the first fluid with the second fluid and vice versa to switch between the conduction and insulation modes. The first fluid can be chemically different from the second fluid.

The interior wall can include a first surface facing inward toward the variable insulation gap. The exterior wall can include a second surface facing inward toward the variable insulation gap. Each of the first and second surfaces can include a reflectively sufficient to ensure convection is dominant over thermal radiation as a heat transfer mode across the variable insulation gap. Standoffs can be included in the variable insulation gap.

A method of operating a system as described above includes rotating the exterior and internal wall panels as a wall of a spacecraft as the spacecraft rotates in a vacuum environment. A source of radiative heat is located on one side of the spacecraft, and a side of the spacecraft opposite from the source of heat is exposed to a background radiation so that the wall of the spacecraft is cyclically exposed to the source of radiative heat alternating with the background radiation. They method includes switching from the conduction mode to the insulation mode for portions of a rotation of the spacecraft between where the wall faces the source of radiative heat and where the wall faces the background radiation opposite the source of radiative heat, and switching to the conduction mode for other portions of the rotation.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
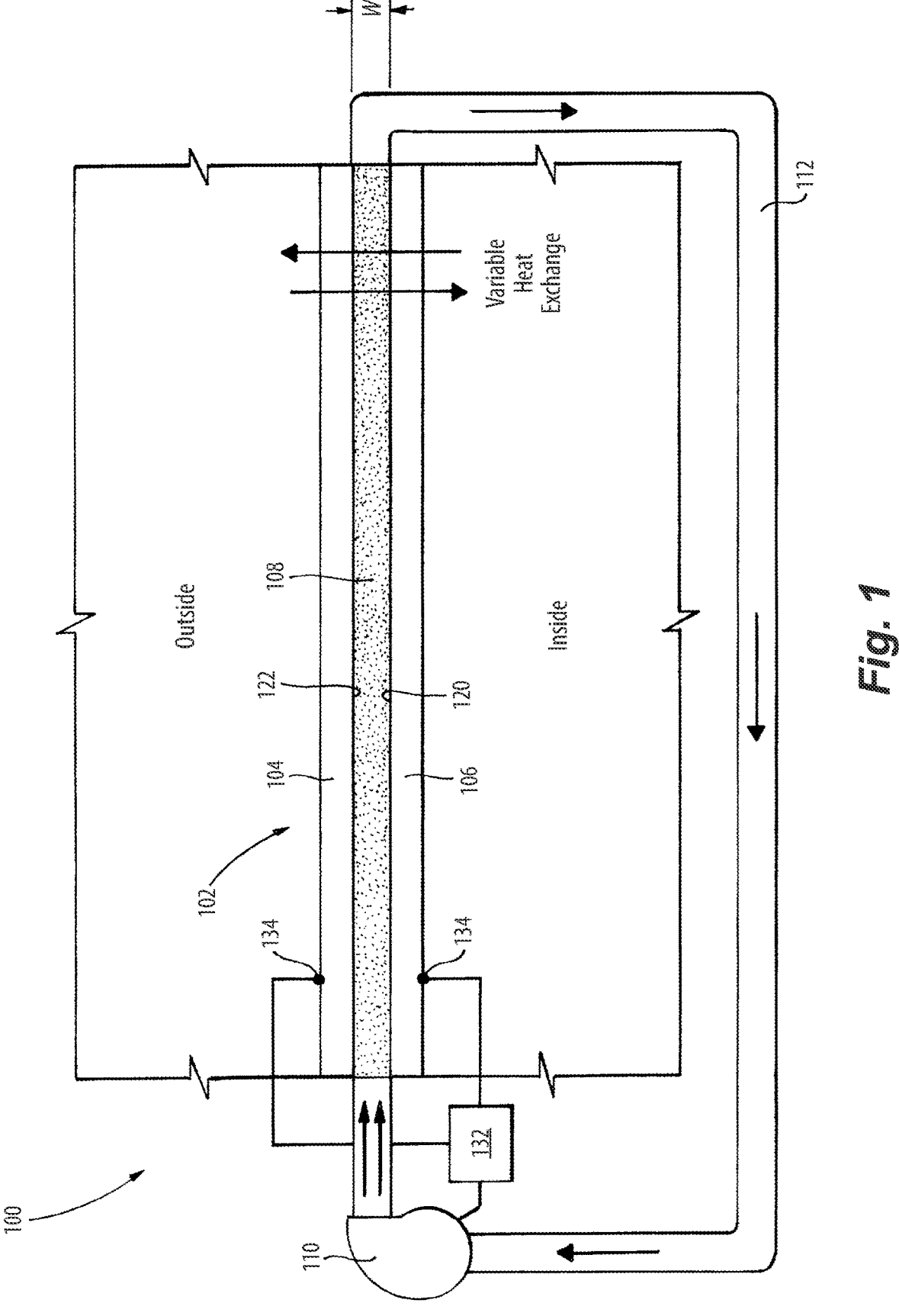
FIG. 1 is a schematic cross-sectional plan view of an embodiment of a system constructed in accordance with the present disclosure, showing the wall panel with spaced apart walls separated by the variable insulation gap.
Figure 2:
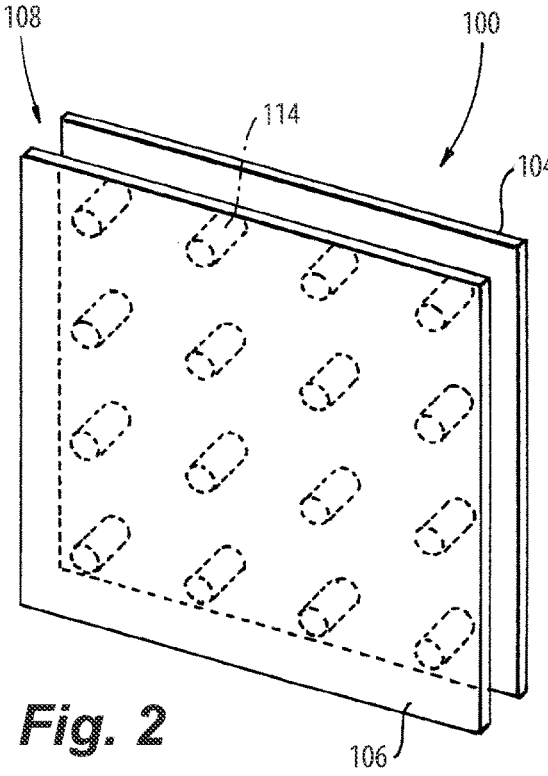
FIGS. 2-4 are schematic perspective views of wall panels as shown in FIG. 1 with three different kinds of spacers for maintaining the width of the variable insulation gap, pins, fins, and wavy fins, respectively.
Figure 3:
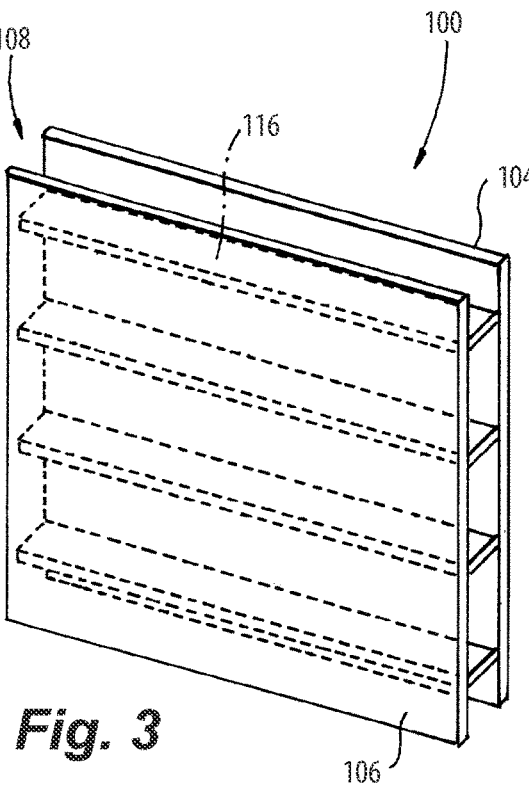
Figure 4:
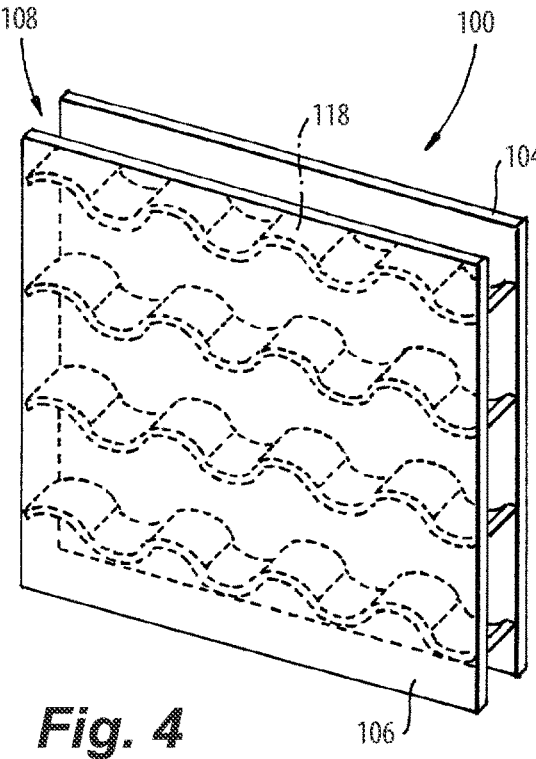
Figure 5:
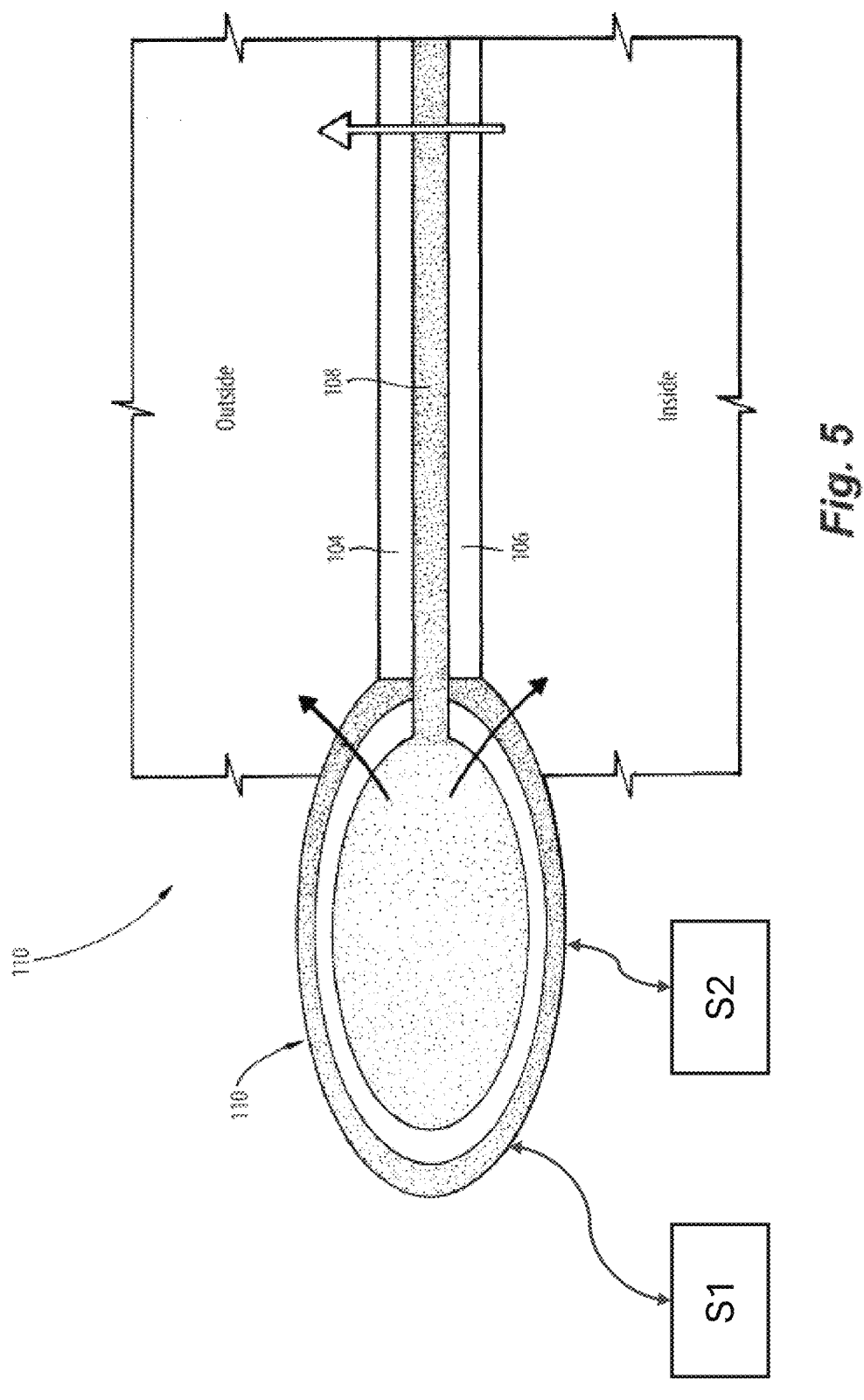
FIG. 5 is a schematic cross-sectional plan view of an embodiment of the system of FIG. 1, showing a bimetallic mechanism as the driver for variable insulation switching.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to control thermal conductivity or thermal resistivity in wall panels, such as for regulating temperatures in spacecraft, aircraft, or high-speed vehicle or capsule or the like.

The system includes a wall panel 102, e.g. for the exterior wall of a spacecraft, aircraft, or the like. The wall panel 102 includes an exterior wall 104 and an interior wall 106 that is separated from the exterior wall 104 by a variable insulation gap 108 occupied by an insulation medium such as a liquid, a gas, or a vacuum which for purposes of this disclosure includes a gas-evacuated volume which can include trace amounts of gas effectively behaving like a vacuum. A flow driver 110 is connected in fluid communication with the insulation medium in the gap 108. The flow driver 110 is configured to selectively switch properties of the insulation medium in the variable insulation gap 108 between a conduction mode and in an insulation mode. The insulation medium has a first effective thermal conductivity in the insulation mode, and a second effective thermal conductivity in the conduction mode. The first effective thermal conductively is lower than the second effective thermal conductivity.

The gap 108 has a substantially constant width W spatially, and is also substantially constant over time regardless of whether the flow driver 110 is in the insulation mode or in the conduction mode. The substantially constant width W, the insulation medium in the gap 108, the exterior wall 104, and the interior wall 106 are all configured so that in the insulation mode, the gap 108 is too narrow for natural convection currents to form turbulent flows in the gap 108. The gap width W can be maintained by standoffs in the gap 108, such as the pins 114 shown in FIG. 2, the straight fins 116 shown in FIG. 3, the wavy fins 118 shown in FIG. 4, or any other suitable type of standoffs that allow for the change in fluid needed to switch between the insulation mode and the conduction mode. The small insulating standoffs 114, 116, 118 do not conduct heat easily, but they do allow for flow through the gap 108.

With reference again to FIG. 1, the flow driver 110 can be a fan, a blower, an agitator, a fluid chamber with thermally adaptive geometry/volume, or a pump. The outlet of the flow driver 110 is connected to a first end of the gap 108, and a return conduit 112 connects to the opposite end of the gap to return fluid to the flow driver 110. The flow driver 110 is configured to stop fluid flow through the variable insulation gap 108 in the insulation mode to inhibit convection across the variable insulation gap 108. The flow driver 110 is configured to drive fluid through the gap 108 in the conduction mode to cause convective heat transfer across the variable insulation gap 108 for heat exchange between the exterior and interior walls 104, 106 by forced convection.

The insulation medium is of a single phase in both the insulation mode and in the conduction mode, i.e. the insulation medium does not change phase.

In a more general sense, the flow driver 110 switches between the insulation mode and the conduction mode by changing properties of the fluid medium in the gap 108, and in the case show in FIG. 1, the property switched is convection coefficient, by switching between forced convection in the conduction state and natural convection in the insulation state. As described above, in the insulation state, there is little or no convective heat transfer across the gap 109. The flow driver 110 is configured to switch repeatedly back and forth between the conduction and insulation modes as often as needed, e.g. by stopping flow and starting flow through the gap 108 as needed to regulate temperatures on the inside of the wall panel 102.

The insulation medium in the gap 108 can have a convective heat transfer coefficient h between 2.5-25 W/(m²K), inclusive of endpoints, in the insulation mode, and a heat transfer coefficient h between 10-500 W/(m²K), inclusive of endpoints, in the conduction mode, wherein h is higher in the conduction mode than in the insulation mode. The heat transfer coefficient h in the conduction mode can be at least 5 times greater than in the insulation mode.

The flow driver 110 is configured to change pressure and/or density of the insulation medium in the gap 108 in switching between the insulation mode and the conduction mode. In one configuration, in the insulation mode the insulation medium is a vacuum, inclusive of trace amounts of gas. In the conduction mode, the insulation medium can be a pressurized gas. In this configuration, the flow driver 110 changes between the insulation and conduction modes by evacuating or filling the gap 108 with the gas medium. In the configuration shown in FIG. 5, the density of the gas is altered between dense and less dense, based on the state of a bimetallic tank as the flow driver 110. As the temperature of the bimetallic element changes, the geometry and/or volume of the bimetallic element change, causing a rise or fall in the gas pressure inside the gap 108. Changing the state back and forth of the bimetallic tank switches between the insulation mode and the conduction mode. Although described above with a constant gap width W, it is also contemplated that a configuration can be made wherein the flow driver 110 inflates the gap 108 to expand its width W or contract its width W to adjust the effective thermal conductivity or thermal resistance across the gap 108.

In another configuration, the insulation medium is a first fluid, stored in a first storage S1, utilized in the insulation mode, and is a second fluid, stored in a second storage S2, utilized in the conduction mode, wherein the flow driver is configured to swap the first fluid with the second fluid and vice versa to switch between the conduction and insulation modes. The first fluid is chemically different from the second fluid, e.g. air for the insulation mode and water or oil for the conduction mode.

With continued reference to FIG. 1, the interior wall 106 includes a first surface 120 facing inward toward the variable insulation gap 108. The exterior wall 104 includes a second surface 122 facing inward toward the variable insulation gap 108. Each of the first and second surfaces 120, 122 includes a reflectively sufficient to ensure convection is dominant over thermal radiation as a heat transfer mode across the variable insulation gap 108.

During the conduction mode, heat exchange can be into the interior space, or out of the interior space as indicated by the two long heat transfer arrows in FIG. 1. For example, if a spacecraft needs to expel heat to the outside, the conduction mode will allow for this. Similarly, if the interior of a spacecraft needs to receive heat from the outside, the conduction mode can allow this. When the interior of the spacecraft needs to expel heat but the outside wall 104 is at higher temperatures than the interior of the space craft, the insulation mode can be used as a heat shield to help keep the interior of the spacecraft from heating up even more. Similarly, if the interior of the spacecraft is at or near a cold limit, and the outside wall 104 is colder than the interior of the spacecraft, the insulation mode can be used to preserve heat in the interior of the spacecraft.

Figure 6:
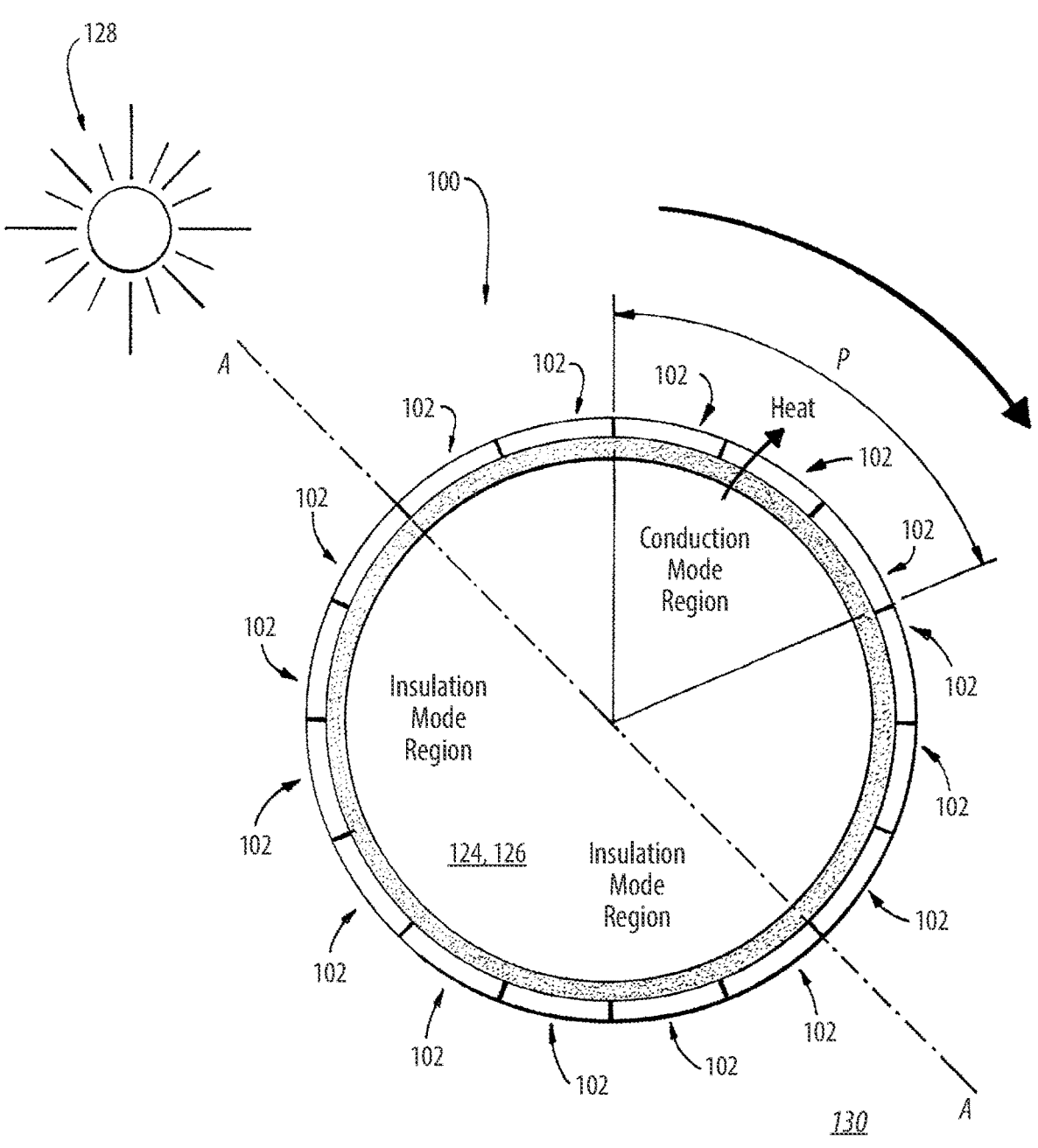
FIG. 6 is a schematic view of the system of FIG. 1, showing a rotating spacecraft with at least one of the wall panels of FIG. 1, and showing a method of switching the wall panel between conduction and insulation modes as the spacecraft rotates to regulate temperatures inside the spacecraft.

With reference now to FIG. 6, a spacecraft 124 is shown schematically, with a plurality of wall panels 102 as described above enclosing the interior 126 of the spacecraft. A method of operating a system as described above includes allowing the exterior and internal walls 104, 106 (labeled in FIG. 1) in each wall 102 of a spacecraft 124 to rotate as the spacecraft rotates in a vacuum environment, as indicated by the rotation arrow in FIG. 6. A source 128 of radiative heat such as the sun or a planetary body such as the moon or Venus, is located on one side of the spacecraft 124. A side of the spacecraft 124 diametrically opposite along the axis A from the source 128 of heat is exposed to a background radiation 130 so that each thermally adaptive wall 102 of the spacecraft 124 is cyclically exposed to the source 128 of radiative heat alternating with the background radiation 130. The method includes switching from the conduction mode to the insulation mode for portions of a rotation of the spacecraft between where a given one of the thermally adaptive walls 102 faces the source 128 of radiative heat and where the thermally adaptive wall 102 faces the background radiation opposite the source of radiative heat, and switching to the conduction mode for other portions P of the rotation. Heat exchange in the portions P of the rotation can either be heat flowing into the interior 126, or heat flowing out of the interior 126 as needed, and as indicated by the heat transfer arrows in the portion P of the rotation in FIG. 6. This method can be implemented by a controller 132, e.g. as machine readable instructions on the controller 132, connected to control the flow driver 110 of FIG. 1. The controller 132 can use sensors 134 for feedback control based on the temperatures of the walls 104, 106.

It is desirable to have systems and methods as disclosed herein that allows heat exchange at some conditions, while being thermally insulating at other conditions. Applications of systems and method as disclosed herein include spacesuits, space modules, or satellites where temperature ranges can be extreme. The skin of an aircraft can benefit since the outside environment can be very cold at altitude conditions to very hot at hypersonic conditions or on a hot day. An environmental control system (ECS) which is mounted within a compartment on an aircraft can benefit. A layer within a heat exchanger to prevent overheating or freezing of fluids can benefit. A compartment on an aircraft such as an electronics bay adjacent to the outside of the plane can benefit.

In all of these examples, the environment outside of the device varies greatly depending on the condition it is in, and inside of the device or compartment there is a need to keep the temperature range controlled. In some instances, it is advantageous to insulate, while others allows heat transfer.

Systems and methods as disclosed herein allows for broader thermal envelopes, which can increase capability, performance, or efficiency of components. The rate of convection does not need to be constant over the entire device. This can be useful to heat/cool certain regions more than others. The systems and methods disclosed herein can be made low in weight and high in reliability, and can be used as smart thermal insulation. High levels of variability of thermal conduction are possible with systems and methods disclosed herein, up to 200 times or more between the conduction mode versus the insulation mode. Systems and methods as disclosed herein can be applied to heat exchanger with automated heat flux or stream outlet temperature. Such exchangers can be employed in fuel or oil heating to prevent coking, water heating to prevent overheating.

The methods and systems of the present disclosure, as described above and shown in the drawings, provide for controlling thermal conductivity or thermal resistivity in wall panels, such as for regulating temperatures in spacecraft, aircraft, or high-speed vehicle or capsule or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A transport vehicle comprising
an interior;
a plurality of wall panels enclosing the interior to define an exterior of the vehicle, wherein each of the wall panels comprises:
an exterior wall;
an interior wall separated from the exterior wall by a variable insulation gap occupied by an insulation medium; and
a flow driver connected in fluid communication with the insulation medium,
wherein:
the flow driver is configured to selectively switch properties of the insulation medium in the variable insulation gap between a conduction mode and in an insulation mode;
the insulation medium has a first effective thermal conductivity in the insulation mode, and
a second effective thermal conductivity in the conduction mode;
the first effective thermal conductively is lower than the second effective thermal conductivity;
the insulation medium is a first fluid in the insulation mode, and is a second fluid in the conduction mode, wherein the flow driver is configured to swap the first fluid with the second fluid and vice versa to switch between the conduction and insulation modes;
the first fluid is chemically different from the second fluid; and
the first fluid is air and the second fluid is water or oil.

2. The vehicle as recited in claim 1, wherein the gap has a substantially constant width spatially, and wherein the substantially constant width is also substantially constant over time regardless of whether the flow driver is in the insulation mode or in the conduction mode.

3. The vehicle as recited in claim 2, wherein the driver is configured to stop fluid flow through the variable insulation gap in the insulation mode to inhibit convection across the variable insulation gap, and to drive fluid through the gap in the conduction mode to cause convective heat transfer across the variable insulation gap by forced convection.

4. The vehicle as recited in claim 3, wherein the insulation medium has a convective heat transfer coefficient h between 2.5-25 W/(m²K), inclusive of endpoints, in the insulation mode, and a heat transfer coefficient h between 10-500

W/(m$^2$K), inclusive of endpoints, in the conduction mode, wherein h is higher in the conduction mode than in the insulation mode.

5. The vehicle as recited in claim 4, wherein the heat transfer coefficient in the conduction mode is at least 5 times greater than in the insulation mode.

6. The vehicle as recited in claim 1, wherein the flow driver includes at least one of a fan, a blower, an agitator, a fluid chamber with thermally adaptive geometry/volume, or a pump.

7. The vehicle as recited in claim 1, wherein standoffs are included in the variable insulation gap.

8. The vehicle of claim 1, wherein the vehicle is a spacecraft.

9. The vehicle of claim 1, wherein the vehicle is an aircraft.

10. The vehicle of claim 1, wherein the vehicle is a capsule.

\* \* \* \* \*